(12) United States Patent  (10) Patent No.: US 7,261,306 B2
Trotter  (45) Date of Patent: Aug. 28, 2007

(54) GROMMET DEVICE

(75) Inventor: Jason K. Trotter, Des Plaines, IL (US)

(73) Assignee: Illinois Tool Works Inc, Glenview, IL (US)

( * ) Notice: Subject to any disclaimer, the term of this patent is extended or adjusted under 35 U.S.C. 154(b) by 274 days.

(21) Appl. No.: 11/100,283

(22) Filed: Apr. 6, 2005

(65) Prior Publication Data

US 2006/0226622 A1 Oct. 12, 2006

(51) Int. Cl.
*B60G 21/05* (2006.01)
*B60G 9/00* (2006.01)

(52) U.S. Cl. .................. 280/124.106; 280/124.134; 280/124.166; 280/93.502; 16/2.1; 16/2.2

(58) Field of Classification Search ........... 280/124.13, 280/124.134, 124.137, 124.166, 124.167, 280/124.149, 124.169, 124.107, 124.1; 267/276; 16/2.1, 2.2
See application file for complete search history.

(56) References Cited

U.S. PATENT DOCUMENTS

| | | | |
|---|---|---|---|
| 1,120,367 A | 12/1914 | Booraem et al. | |
| 2,225,472 A | 12/1940 | Franklin | |
| 2,661,969 A | * 12/1953 | Thiry | 403/228 |
| 2,800,526 A | 7/1957 | Moorhead | |
| 2,855,212 A | 10/1958 | Houser | |
| 3,552,785 A | * 1/1971 | Elder et al. | 403/197 |
| 4,944,523 A | 7/1990 | Hardy, Jr. et al. | |
| 5,449,193 A | 9/1995 | Rivard et al. | |
| 5,551,722 A | 9/1996 | Schwartz et al. | |
| 5,704,631 A | 1/1998 | Sparks et al. | |
| 5,807,010 A | 9/1998 | Parker et al. | |
| 6,070,835 A | 6/2000 | Stillinger | |
| 6,398,451 B1 | 6/2002 | Zetterstrom | |
| 6,402,171 B1 | 6/2002 | Nickerson et al. | |
| 6,572,127 B2 | 6/2003 | Pazdirek | |
| 6,631,914 B2 | * 10/2003 | Kawamura et al. | 280/124.107 |
| 2002/0109324 A1 | * 8/2002 | Kawamura et al. | 280/124.107 |
| 2005/0241103 A1 | * 11/2005 | Dobson et al. | 16/2.1 |

\* cited by examiner

*Primary Examiner*—Paul N. Dickson
*Assistant Examiner*—Joseph Rocca
(74) *Attorney, Agent, or Firm*—Mark W. Croll; Paul F. Donovan

(57) ABSTRACT

The present invention relates to grommets. In particular, the present invention relates to grommets used within vehicle suspension systems. In preferred embodiments, the dome end of the grommet comprises an anular extension that engages a fastener or bolt extending through the grommet.

9 Claims, 5 Drawing Sheets

GROMMET DEVICE

FIELD OF THE INVENTION

The present invention relates to grommet devices. In particular, the present invention relates to grommet devices used within vehicle suspension systems.

BACKGROUND

Independent vehicle suspension systems are used to absorb road shocks and other vibrations and provide a smoother, more comfortable automobile ride. In suspension systems of this type, a stabilizer bar is normally incorporated to increase roll resistance and improve the steering to stability of the vehicle. Typically, the stabilizer bar is a torsion rod that extends transversely of the vehicle. It has an integral crank arm provided at each end. The rod is rotatably supported from the vehicle chassis adjacent each crank arm, and each crank arm is coupled to a control arm by a connector link assembly.

When the vehicle is subject to forces which cause it to roll, the crank arms pivot relatively about the longitudinal axis of the rod, against the torsional resistance of the rod. Torsion forces which are exerted through the crank arms urge the control arms of the vehicle back toward their normal position. This type of stabilizer bar acts in a manner such that when paired left and right wheels differ in level from each other due to a cornering maneuver, for example, the vehicle body will be prevented from excessive rolling or leaning to either side by torsional resistance of the stabilizer bar.

The link assembly, which connects the crank arms of the torsion rod to the vehicle body and to the control arms, is generally a bolt-type assembly. Examples of such assemblies are described in, for example, U.S. Pat. Nos. 4,944,523, 5,704,631, 6,402,171, 6,572,127, and U.S. Patent Application No. 2003/0226939; each herein incorporated by reference in their entireties. Generally, in a bolt-type assembly a suitably dimensioned bolt and washer are used to connect the stabilizer bar to the vehicle control arm. Grommets assembled on the bolt engage the exterior surfaces of the stabilizer bar arms and the vehicle control arms. A pair of similarly shaped grommets engage the interior surfaces of the respective vehicle elements and are in engagement with a pair of inner washers which are maintained at a predetermined spaced distance by a cylindrical sleeve mounted on the shaft of the bolt.

Prior art constructions have generally suffered from complexity and cost shortcomings. Such assemblies normally comprises at least four, and sometimes as many as six, different components. Furthermore, assembly is normally done on the vehicle assembly line from these many components.

Limitations with presently available suspension systems include link assemblies that expose the bolt to high levels of stress load during angulation of the control arm and/or stabilizer bar. What are needed are improved grommets that decrease the amount of stress load upon the bolts within suspension systems.

SUMMARY OF THE INVENTION

The present invention relates to grommets. In particular, the present invention relates to grommets used within vehicle suspension systems.

In some embodiments, the present invention provides a grommet, comprising a base end and a dome end, the grommet having therein a cylindrical bore running from the center of the base end through the center of the dome end, the cylindrical bore defined by a cylindrical surface, and an annular extension extending from the dome end of the cylindrical surface into the cylindrical bore. In some embodiments, the base end has therein an annular groove for receiving a washer. In some preferred embodiments, the cylindrical bore is configured to receive a fastener. The grommets of the present invention are not limited to any particular material. Indeed, grommets made from a variety of materials are contemplated. In some embodiments, the grommet is formed from an elastomeric material. In some preferred embodiments, the elastomeric material is synthetic rubber.

In other embodiments, the present invention provides systems comprising a link assembly, the link assembly comprising a first and second washer, and a first and second grommet, the first and second grommets comprising a base end, a dome end, and having therein a cylindrical bore running from the center of the base end through the center of the dome end, the cylindrical bore defined by a cylindrical surface, and an annular extension extending from the dome end of the cylindrical surface into the cylindrical bore, and wherein the washers are positioned within the annular grooves of the first and second grommets; a rod with an eyelet therein, wherein the rod is positioned between the first and second grommets such that the dome ends of the first and second grommets engage the rod eyelet; and a fastener comprising a head and shaft, wherein the fastener is positioned such that the fastener shaft passes through the first washer, through the first grommet, through the rod eyelet, through the second grommet, and through the second washer.

In some embodiments, the annular extensions of the first and second grommets retain the fastener shaft in coaxial alignment with the link assembly and the rod eyelet. In further embodiments, the angulation of the rod places a stress load upon the dome ends of the first and second grommet devices. In still further embodiments, the stress load causes the annular extensions to engage the fastener. In some preferred embodiments, the shaft is a control arm. In other preferred embodiments, the shaft is a stabilizer bar. The grommets of the systems of the present invention are not limited to any particular material. Indeed, grommets made from a variety of materials are contemplated. In some embodiments, the grommet is formed from an elastomeric material. In some preferred embodiments, the elastomeric material is synthetic rubber.

In other embodiments, the present invention provides systems comprising a link assembly, the link assembly comprising first, second, third and fourth washers, first, second, third and fourth grommets, a spacer tube, and a nut, the grommets comprising a base end, a dome end, and having therein a cylindrical bore running from the center of the base end through the center of the dome end, the cylindrical bore defined by a cylindrical surface, and an annular extension extending from the dome end of the cylindrical surface into the cylindrical bore, wherein the spacer tube is positioned between the second and third grommets, and wherein the first, second, third, and fourth washers are respectively positioned within the annular grooves of the first, second, third, and fourth grommets, wherein the nut is positioned after the fourth washer; a control arm with an eyelet therein, wherein the control arm is positioned between the first and second grommets such that the dome ends engage the control arm eyelet; a stabilizer bar with an eyelet therein, wherein the stabilizer bar is positioned between the third and fourth grommets such that the dome ends engage the stabilizer bar eyelet; a fastener comprising a head and shaft, wherein the fastener is positioned such that the fastener shaft passes through the first washer, through the first grommet, through the control arm eyelet, through the second grommet, through the second washer, through the spacer bar, through the third washer, through the third grommet, through the stabilizer bar eyelet, through the fourth grommet, through the fourth washer, and through the nut.

In some embodiments, the annular extensions of the grommets retain the fastener shaft in coaxial alignment with the link assembly and the control arm eyelet and stabilizer bar eyelet. In some preferred embodiments, angulation of the control arm places a stress load upon the dome ends of the first and second grommet devices. In other preferred embodiments, angulation of the stabilizer bar places a stress load upon the dome ends of the third and fourth grommet devices. In still further preferred embodiments, the stress load causes the annular extensions to engage the fastener. The grommets of the present invention are not limited to any particular material. Indeed, grommets made from a variety of materials are contemplated. In some embodiments, the grommet is formed from an elastomeric material. In some preferred embodiments, the elastomeric material is synthetic rubber.

DETAILED DESCRIPTION

The present invention relates to grommet devices. In particular, the present invention relates to grommets used within vehicle suspension systems. FIGS. 1-5 illustrate various preferred embodiments of the grommet devices and suspension systems of the present invention. The present invention is not limited to these particular embodiments.

The grommet devices of the present invention are applicable for receiving and securing fasteners (e.g., bolts) within holes. In preferred embodiments, the grommet devices of the present invention find use within vehicle suspension systems as means of securing fasteners within the eyelets of stabilizer bars and/or control arms. The use of grommet devices is standard within modern vehicle suspension systems. The grommet devices of the present invention provide numerous advantages over prior art grommet devices including, but not limited to, increased durability. Additionally, vehicle suspension systems utilizing the grommet devices of the present invention provide numerous advantages over prior art vehicle suspension systems including, but not limited to, 1) reduced stress load upon the grommet devices during angulation of the control arm and/or stabilizer bar, 2) reduced shifting of the fastener out of coaxial alignment with the link assembly, and 3) increased lifespan of the vehicle suspension system. The present invention is not limited to any particular mechanism. Indeed, an understanding of the mechanism is not necessary to practice the present invention. Nevertheless, it is contemplated that the grommet device functions on the principle that distribution of an angulation stress load to a smaller area of the grommet body and fastener results in increased grommet durability and extended lifespan of the vehicle suspension system (described in more detail below).

Figure 1:
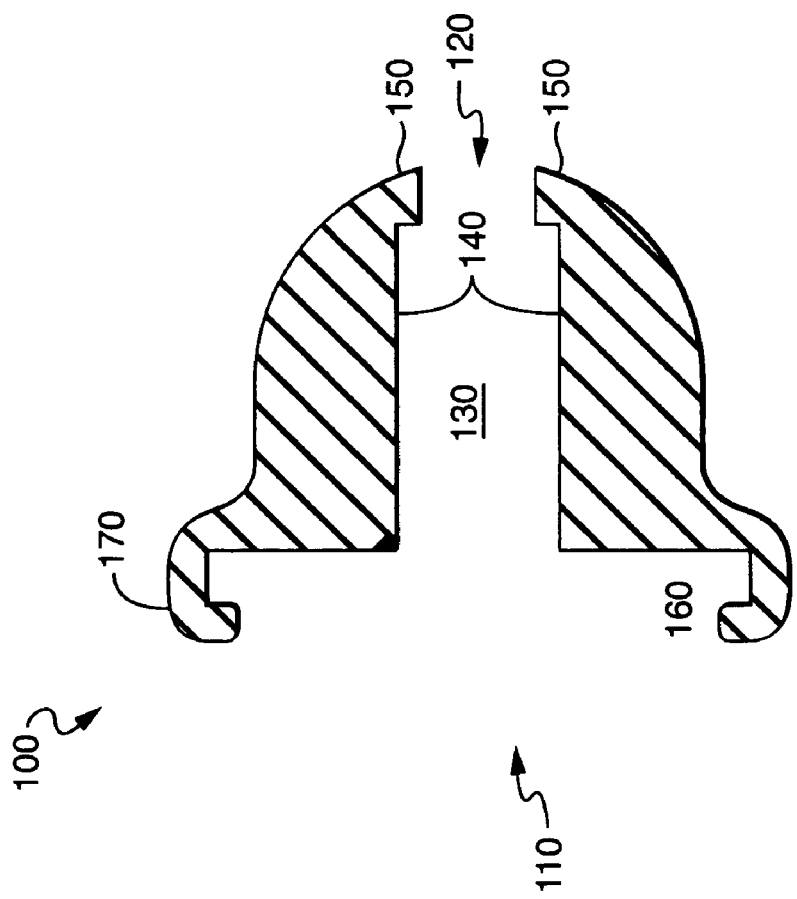
FIG. 1 shows a cross-sectional side view of a grommet device of the present invention.

FIG. 1 shows a cross-sectional side view of a grommet device 100 embodiment of the present invention. The grommet device 100 is not limited to a particular material composition (e.g., synthetic rubber, natural rubber, elastomeric material, polyurethane, or mixture thereof). In preferred embodiments, the material composition of the grommet device 100 is synthetic rubber. The grommet device 100 is not limited to a particular shape (oval shaped, dome shaped). In preferred embodiments, the grommet device 100 is dome shaped. In preferred embodiments, the grommet device 100 configured to receive and secure a fastener (e.g., threaded fastener, bolt) within a vehicle suspension system (described in more detail below).

Still referring to FIG. 1, in some embodiments, the grommet device 100 generally comprises a base end 110, and a dome end 120. Additionally, in preferred embodiments, the grommet device 100 has therein a cylindrical bore 130 running from approximately the center of the base end 110 through the approximate center of the dome end 120. In preferred embodiments, the cylindrical bore 130 is defined by a cylindrical surface 140. The cylindrical bore 120 is not limited to a particular diameter measurement. In preferred embodiments, the cylindrical bore 130 is configured to receive and secure a fastener (described in more detail below).

Still referring to FIG. 1, in preferred embodiments, an annular extension 150 extends from the dome end 120 of the cylindrical surface 140 into the cylindrical bore 130. The annular extension 150 reduces the size of the cylindrical bore 130 within the dome end 120. The annular extension 150 is not limited to a particular size. In preferred embodiments, as the grommet device 100 receives a fastener within a vehicle suspension system, the annular extension 150 serves to retain the fastener in coaxial alignment, and, upon angulation of a control arm and/or stabilizer bar, the annular extension 150 engages the fastener thereby reducing the stress load upon the fastener and grommet device 100 (described in more detail below).

Still referring to FIG. 1, in preferred embodiments, the base end 110 has therein an annular groove 160 for receiving a washer. The annular groove 160 is surrounded by a base end skirt extension 170. In preferred embodiments, as the grommet device 100 receives a washer and a fastener within a vehicle suspension system, the washer further assists the annular extension 150 in retaining the fastener in coaxial alignment (described in more detail below).

Figure 2:
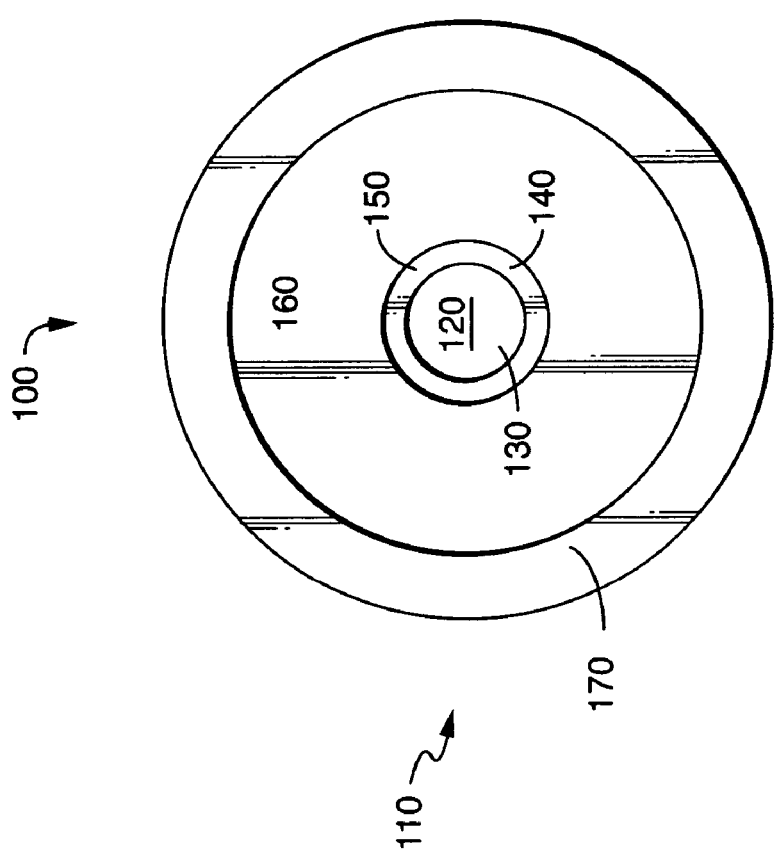
FIG. 2 depicts a perspective of a grommet device of the present invention from the base end through the dome end.

FIG. 2 depicts a perspective of the grommet device 100 from the base end 110 through the dome end 120. As shown, the grommet device 100 has therein a cylindrical bore 130 running from the center of the base end 110 through the center of the dome end 120, wherein the cylindrical bore 130 is defined by a cylindrical surface 140. Additionally, an annular extension 150 extends from the dome end 120 of the cylindrical surface 140 into the cylindrical bore 130, and the base end 110 has therein an annular groove 160 surrounded by a base end skirt extension 170 for receiving a washer, wherein the annular groove 160 is surrounded by a base end skirt extension 170.

Figure 3:
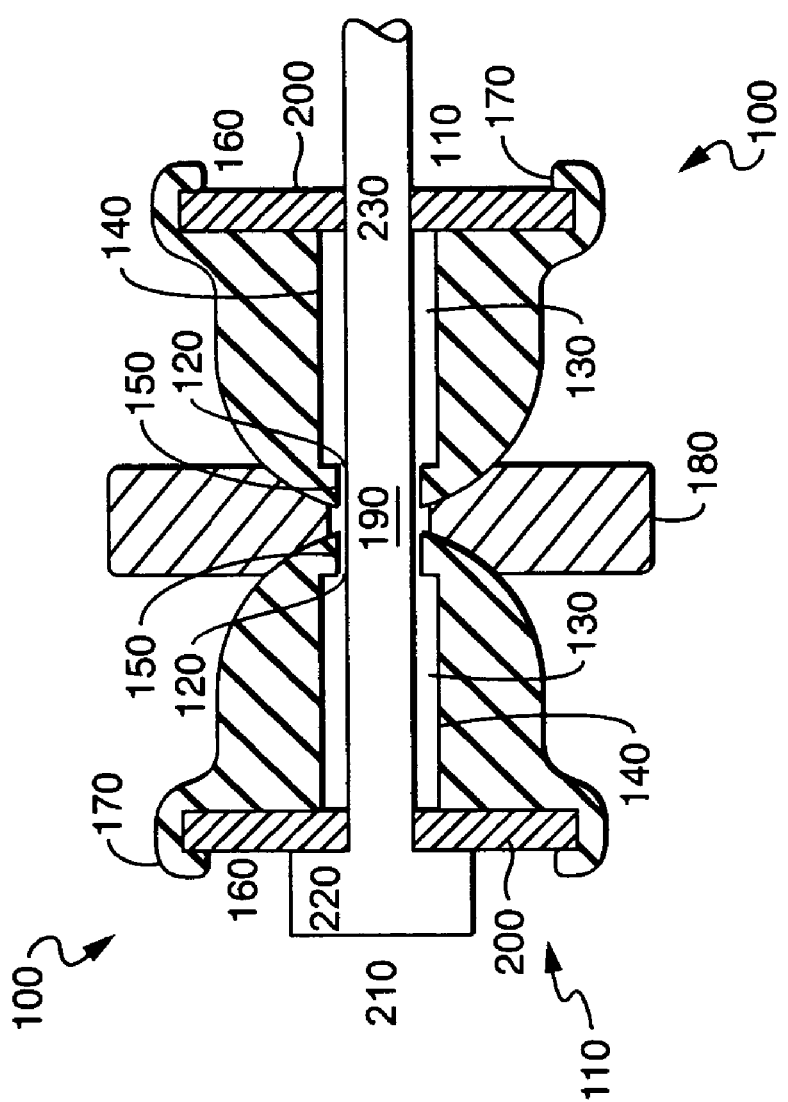
FIG. 3 depicts a cross-sectional side view of a vehicle suspension system.

FIG. 3 depicts a cross-sectional side view of a vehicle suspension system embodiment of the present invention. As shown, a rod 180 (e.g., control arm, stabilizer bar) with an eyelet 190 is positioned between two grommet devices 100 such that the respective dome ends 120 engage the eyelet 190. Additionally, the grommet devices 100 each have therein a cylindrical bore 130 running from the center of the base end 110 through the center of the dome end 120, wherein the cylindrical bore 130 is defined by a cylindrical surface 140. Additionally, as shown, the grommet devices 100 each have an annular extension 150 extending from the dome end 120 of the cylindrical surface 140 into the cylindrical bore 130, and the base end 110 has therein an annular groove 160 surrounded by a base end skirt extension 170 for receiving a washer, wherein the annular groove 160 is surrounded by a base end skirt extension 170. Washers 200 are positioned within the annular grooves 160 of the respective grommet devices 100, and are fixed into position by the respective base end skirt extensions 170.

Still referring to FIG. 3, the system further contains a fastener 210 (e.g., bolt) with a fastener head 220 and fastener shaft 230. As shown, the fastener head 220 is positioned at the base end 110 and is in contact with a washer 200. The fastener shaft 230 is shown extending through the washers 200, grommet devices 100 and rod eyelet 190.

Figure 4:
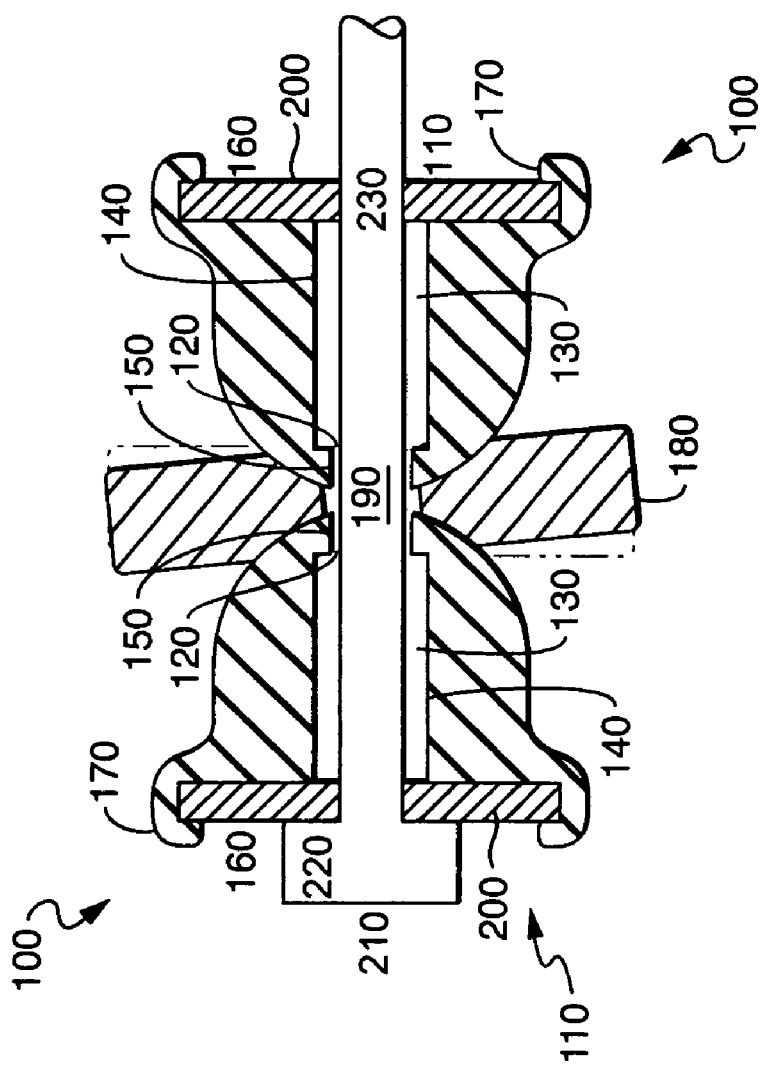
FIG. 4 depicts a cross-sectional side view of a vehicle suspension system wherein the rod is being angulated.

FIG. 4 depicts a cross-sectional side view of a combination within a vehicle suspension system wherein the rod 180 is being angulated. As shown, a rod 180 (e.g., control arm, stabilizer bar) with an eyelet 190 is positioned between two grommet devices 100 such that the respective dome ends 120 engage the eyelet 190. Additionally, the grommet devices 100 each have therein a cylindrical bore 130 running from the center of the base end 110 through the center of the dome end 120, wherein the cylindrical bore 130 is defined by a cylindrical surface 140. Additionally, as shown, the grommet devices 100 each have an annular extension 150 extending from the dome end 120 of the cylindrical surface 140 into the cylindrical bore 130, and the base end 110 has therein an annular groove 160 surrounded by a base end skirt extension 170 for receiving a washer, wherein the annular groove 160 is surrounded by a base end skirt extension 170. Washers 200 are positioned within the annular grooves 160 of the respective grommet devices 100, and are fixed into position by the respective base end skirt extensions 170.

Still referring to FIG. 4, the rod 180 is shown angulating in a direction toward the fastener head 220. Such angulation causes the rod 180 to further engage the dome ends 120 resulting in compression of the dome ends 120. As the dome ends 120 are compressed, the annular extensions 150 of the respective grommet devices 100 are forced to engage the fastener shaft 230, thereby displacing the stress load from the rod 180 angulation onto the fastener shaft 180.

Figure 5:
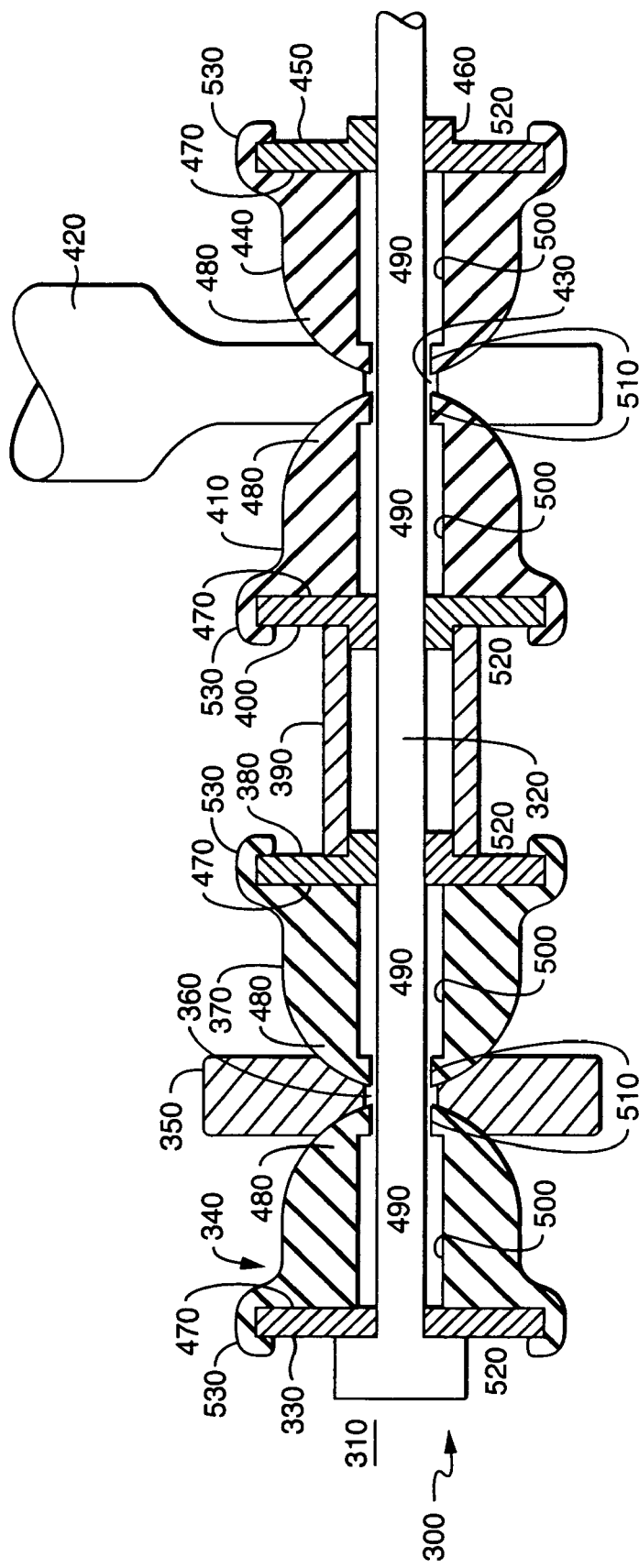
FIG. 5 depicts a cross-sectional side view of a vehicle suspension system embodiment.

FIG. 5 depicts a cross-sectional side view of an alternative vehicle suspension system embodiment. As shown, the vehicle suspension system contains, in the order presented, a fastener 300 with a fastener head 310 and a fastener shaft 320, a first washer 330, a first grommet device 340, a control arm 350 with a control arm eyelet 360, a second grommet device 370, a second washer 380, a spacer tube 390, a third washer 400, a third grommet device 410, a stabilizer bar 420 with a stabilizer bar eyelet 430, a fourth grommet device 440, a fourth washer 450, and a nut 460. The second and third washers 380 and 400 have flanges for receiving the spacer tube 390.

Still referring to FIG. 5, each of the grommet devices 340, 370, 410, and 440 generally comprise a base end 470 and a dome end 480. Additionally, the grommet devices 340, 370, 410, and 440 each have therein a cylindrical bore 490 running from the center of the base end 470 through the center of the dome end 480, wherein the cylindrical bore 490 is defined by a cylindrical surface 500. Additionally, as shown, the grommet devices 340, 370, 410, and 440 each have an annular extension 510 extending from the dome end 480 of the cylindrical surface 500 into the cylindrical bore 490, and the base end 470 has therein an annular groove 520 surrounded by a base end skirt extension 530 for receiving the washers 330, 380, 400, and 450.

Still referring to FIG. 5, the control arm 350 is positioned between the first and second grommet devices 340, 370, such that the respective dome ends 480 engage the control arm eyelet 360 in a manner creating a passage. Similarly, the stabilizer bar 420 is positioned between the third and fourth grommet devices 410, 430, such that the respective dome ends 480 engage the stabilizer bar eyelet 430 in a manner creating a passage. The washers 330, 380, 400, and 450 are secured within the annular grooves 520 and base end skirt extensions 530 of the respective grommet devices 340, 370, 410, and 440. The spacer tube 390 is between the second and third washers 380 and 400 such that the spacer tube 390 engages the flanges of the second and third washers 380 and 400. The flanges of the second and third washers 380 and 400 serve to prevent the spacer tube 390 from engaging the fastener shaft 320. The spacer tube 390 secures the second and third grommet devices 370 and 410 against control arm 350 and stabilizer bar 420, respectively.

Still referring to FIG. 5, the fastener head 310 is positioned at the interface of the first washer 330 and base end 470 of the first grommet device 340. The fastener shaft 320 is positioned in coaxial alignment within the vehicle suspension system. The fastener shaft 320 is positioned within the passage created with the alignment of the washers 330, 380, 400, and 450, the grommet devices 340, 370, 410, and 440, the control arm eyelet 360, the spacer tube 390, and the stabilizer bar eyelet 430. Additionally, as shown, the fastener shaft 320 extends past the fourth washer 450. The nut 460 engages the fourth washer 450 thereby securing the first and fourth grommet devices 340 and 440 against the control arm 350 and the stabilizer bar 420, respectively. Additionally, the nut 460 serves to secure the fastener 300 in a locked position within the vehicle suspension system.

Still referring to FIG. 5, the annular extensions 510 of the grommet devices 340, 370, 410, and 440 serve to retain the fastener shaft 320 in coaxial alignment upon angulation of the control arm 350 and/or stabilizer bar 420.

The grommet devices of the present invention represents an improvement over prior art grommet devices without dome end opening ribs. Upon angulation of a control arm or stabilizer bar within a vehicle suspension system, the grommet device is forced to flex and assume the angulation stress load over a wide area, and displace it over a wider area of the fastener shaft. Such assumption and displacement of the angulation stress load compromises the durability of the grommet device and the fastener shaft. The grommet devices of the present invention engage a smaller area of the fastener shaft upon control arm and/or stabilizer bar angulation due to the dome end opening ribs. Indeed, only the dome end opening ribs engage the fastener shaft thereby reducing the area of the grommet device that assumes the angulation stress load. Additionally, the area of fastener shaft that assumes the angulation stress load is reduced to that distributed by the dome end opening ribs.

All publications and patents mentioned in the above specification are herein incorporated by reference. Although the invention has been described in connection with specific preferred embodiments, it should be understood that the invention as claimed should not be unduly limited to such specific embodiments. Indeed, various modifications of the described modes for carrying out the invention that are obvious to those skilled in the relevant fields are intended to be within the scope of the following claims.

I claim:

1. A system comprising a link assembly, said link assembly comprising a first and second washer, and a first and second grommet, said first and second grommets comprising a base end, a dome end, and having therein a cylindrical bore running from the center of said base end through the center of said dome end, said cylindrical bore having an inner diameter defined by a cylindrical surface, and an annular extension extending from said dome end of said cylindrical surface into said cylindrical bore, and wherein said washers are positioned within said annular grooves of said first and second grommets;

a rod with an eyelet therein, wherein said rod is positioned between said first and second grommets such that said dome ends of said first and second grommets engage said rod eyelet; and a fastener comprising a head and shaft, wherein said fastener is positioned such that said fastener shaft passes through said first washer, through said first grommet, through said rod eyelet, through said second grommet, and through said second washer, said shaft having an outer diameter that is less than said inner diameter of said cylindrical bore of said first and second grommet devices, and wherein said system is arranged so that angulation of said rod places a stress load upon said dome ends of said first and second grommet devices such that said stress load causes said annular extensions to engage said fastener which in turn inhibit engagement between said outer diameter of said shaft of said fastener and said inner diameter of said cylindrical bore of said first and second grommet devices.

2. The system of claim 1, wherein said annular extensions of said first and second grommets retain said fastener shaft in coaxial alignment with said link assembly and said rod eyelet.

3. The system of claim 1, wherein said rod is a control arm.

4. The system of claim 1, wherein said rod is a stabilizer bar.

5. The system of claim 1, wherein said grommet is formed from an elastomeric material.

6. The system of claim 1, wherein said elastomeric material is synthetic rubber.

7. A system comprising a link assembly, said link assembly comprising first, second, third and fourth washers, first, second, third and fourth grommets, a spacer tube, and a nut, said grommets comprising a base end, a dome end, and having therein a cylindrical bore running from the center of said base end through the center of said dome end, said cylindrical bore having an inner diameter defined by a cylindrical surface, and an annular extension extending from said dome end of said cylindrical surface into said cylindrical bore, wherein said spacer tube is positioned between said second and third grommets, and wherein said first, second, third, and fourth washers are respectively positioned within said annular grooves of said first, second, third, and fourth grommets, wherein said nut is positioned after said fourth washer;

a control arm with an eyelet therein, wherein said control arm is positioned between said first and second grommets such that said dome ends engage said control arm eyelet;

a stabilizer bar with an eyelet therein, wherein said stabilizer bar is positioned between said third and fourth grommets such that said dome ends engage said stabilizer bar eyelet;

a fastener comprising a head and shaft, wherein said fastener is positioned such that said fastener shaft passes through said first washer, through said first grommet, through said control arm eyelet, through said second grommet, through said second washer, through said spacer bar, through said third washer, through said third grommet, through said stabilizer bar eyelet, through said fourth grommet, through said fourth washer, and through said nut, said shaft having an outer diameter that is less than said inner diameter of said cylindrical bore of said first, second, third and fourth grommet devices, and wherein said system is arranged so that angulation of said control arm places a stress load upon said dome ends of said first and second grommet devices such that said stress load causes said annular extensions of said first and second grommet devices to engage said fastener which in turn inhibit engagement between said outer diameter of said shaft of said fastener and said inner diameter of said cylindrical bore of said first and second grommet devices, and wherein said system is further arranged so that angulation of said stabilizer bar places a stress load upon said dome ends of said third and fourth grommet devices such that said stress load causes said annular extensions of said third and fourth grommet devices to engage said fastener which in turn inhibit engagement between said outer diameter of said shaft of said fastener and said inner diameter of said cylindrical bore of said third and fourth grommet devices.

8. The system of claim 7, wherein said annular extensions of said grommets retain said fastener shaft in coaxial alignment with said link assembly and said control arm eyelet and stabilizer bar eyelet.

9. The system of claim 7, wherein said grommet is formed from an elastomeric material.

* * * * *